United States Patent [19]

Scata

[11] Patent Number: 4,756,399

[45] Date of Patent: Jul. 12, 1988

[54] BELT CONVEYOR FOR THE SORTING OF SUNDRY ARTICLES

[75] Inventor: Mario Scata, Teramo, Italy

[73] Assignee: Meccanizzazione Postale e Automazione S.p.A., Teramo, Italy

[21] Appl. No.: 910,306

[22] Filed: Sep. 22, 1986

Related U.S. Application Data

[63] Continuation of Ser. No. 704,446, Feb. 22, 1985, abandoned.

[30] Foreign Application Priority Data

Feb. 24, 1984 [IT] Italy .................................. 19781 A/84

[51] Int. Cl.4 ............................................. B65G 47/64
[52] U.S. Cl. ..................................... 198/369; 209/698; 209/900
[58] Field of Search ....................... 209/698, 707, 900; 198/369, 592, 575, 371, 603

[56] References Cited

U.S. PATENT DOCUMENTS

| | | | |
|---|---|---|---|
| 807,916 | 12/1905 | Edmunds | 198/592 |
| 2,553,310 | 5/1951 | Grandsen | 198/592 |
| 2,937,739 | 5/1960 | Levy | 209/900 |
| 3,179,234 | 4/1965 | Bloom et al. | 198/372 |
| 3,404,775 | 10/1968 | McClellan | 198/370 |
| 4,011,935 | 3/1977 | Massey | 198/592 |
| 4,553,658 | 11/1985 | Gasser | 198/369 |

FOREIGN PATENT DOCUMENTS

| | | | |
|---|---|---|---|
| 2831323 | 1/1980 | Fed. Rep. of Germany . | |
| 2481959 | 5/1980 | France . | |
| 0100014 | 6/1983 | Japan | 198/365 |
| 558749 | 2/1975 | Switzerland . | |
| 0965915 | 10/1982 | U.S.S.R. | 198/598 |

Primary Examiner—Robert B. Reeves
Assistant Examiner—Donald T. Hajec
Attorney, Agent, or Firm—Spencer & Frank

[57] ABSTRACT

The invention comes within the scope of the transportation and sorting systems for articles such as postal articles and refers in particular to a belt conveyor. The conveyor in question includes a plurality of motor-driven conveyor belts arranged close to a plurality of containers for the collection of the sorted articles. According to this invention the conveyor belts are vertically superimposed on the containers and are defined by a plurality of adjacent conveyor units, each of which may be individually driven to oscillate in such a way as to convey the carried articles downwards, directly into the containers.

6 Claims, 3 Drawing Sheets

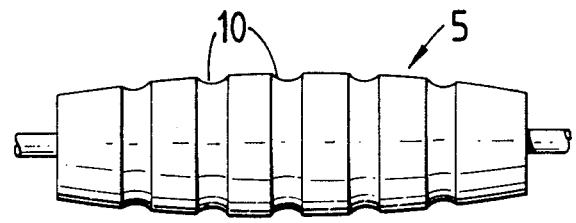
Fig. 3.
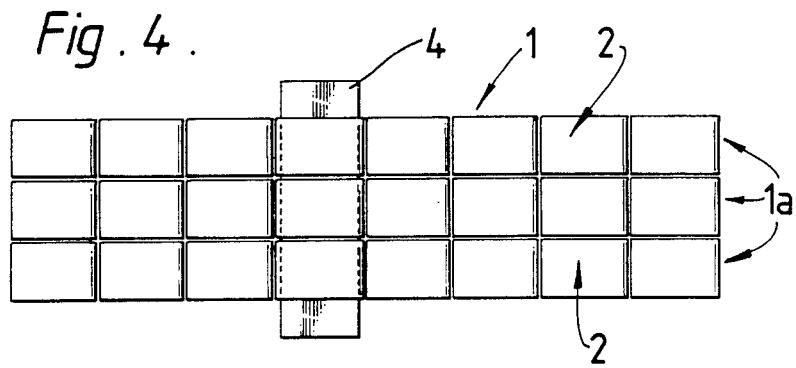
Fig. 4.
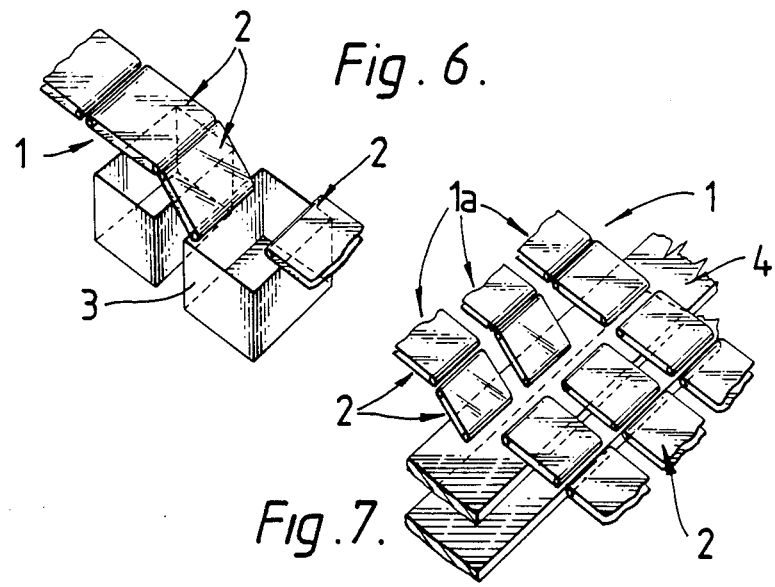
Fig. 6.
Fig. 7.

BELT CONVEYOR FOR THE SORTING OF SUNDRY ARTICLES

This is continuation of Ser. No. 704,446, filed Feb. 22, 1985, now abandoned.

BACKGROUND OF THE INVENTION

The subject-matter of this invention is a belt conveyor for the sorting of sundry articles.

Numerous types of conveyors intended for the sorting of different kinds of articles are presently known. These multipurpose conveyors have many applications: they may be used, for instance, as dispensers for stores, assembly lines, automatic restaurants and canteens, hospitals, community facilities and, in general, for the sorting and forwarding of postal articles. Particularly important among the conveyors presently known are the so-called "belt conveyors" which use as conveyor components the same components which support the articles, suitably powered. This applicant has already conceived a belt conveyor which is provided at the nodal sorting points with a sorting unit capable of alternating belts and rollers moving in opposite directions. This sorting unit is protected by and described in Italian Pat. No. 1.025.846 to which the reader is referred for further information. Subsequent improvements have allowed the construction of multilevel belt conveyors always using the abovementioned sorting unit at the nodal points. Several series-connected sorting units forming a single sorting line have also been used.

All the improvements mentioned above are designed for the construction of belt conveyors capable of carrying an increasingly larger number of articles and of sorting these articles in such a way that the path described by any one article does not interfere with the paths of the neighboring articles. This result is particularly difficult to obtain and has led to the construction of highly complicated and consequently expensive installations. The technical task of the present invention is to design a conveyor which, in spite of a substantially simple and comparatively inexpensive construction, is capable of carrying and distributing a considerable amount of articles, each having an independent path. Within the framework of this technical task, an important target of the present invention consists in designing a conveyor which may also be used in combination with other conveyors already known such as, for instance, the conveyor provided with the above-mentioned sorting unit described in the Italian Pat. No. 1.025.846.

A further purpose of this invention is to design a conveyor which may be easily constructed in the most disparate structural forms so as to be suitablee for as many specific requirements.

SUMMARY OF THE INVENTION

These purposes as well as other purposes which will be subsequently clarified are attained by the belt conveyor according to the present invention intended for the sorting of sundry articles and consisting of a plurality of motor-driven conveyor belts arranged close to a plurality of containers for the collection of the sorted articles, characterized in that said conveyor belts are vertically superimposed on said containers and are defined by a plurality of adjacent conveyor units each of which may be driven to oscillate angularly in such a way as to convey the carried articles downwards, directly into said containers.

BRIEF DESCRIPTION OF THE DRAWINGS

Further features and advantages will result from a preferrd but not exclusive form of construction of the conveyor according to the present invention, taken in conjunction with the accompanying drawings, where:

FIG. 3 shows a roller of the conveyor according to this invention;

FIG. 4 is a schematic plan view of a portion of a conveyor provided with three conveyor ribbons running side by side;

FIGS. 6 and 7 show schematically and in perspective the operation of a belt conveyor with both one and three adjoining conveyor ribbons.

DETAILED DESCRIPTION OF THE PREFERRED EMBODIMENT

With reference to the figures, the belt conveyor according to this invention, is globally denoted by the number 1, and is defined by a plurality of conveyor belts adjoining a plurality of collecting containers. The conveyor belts are motor-driven and are consequently both thes upport and the mover for the sorted articles.

Figures 1, 2:
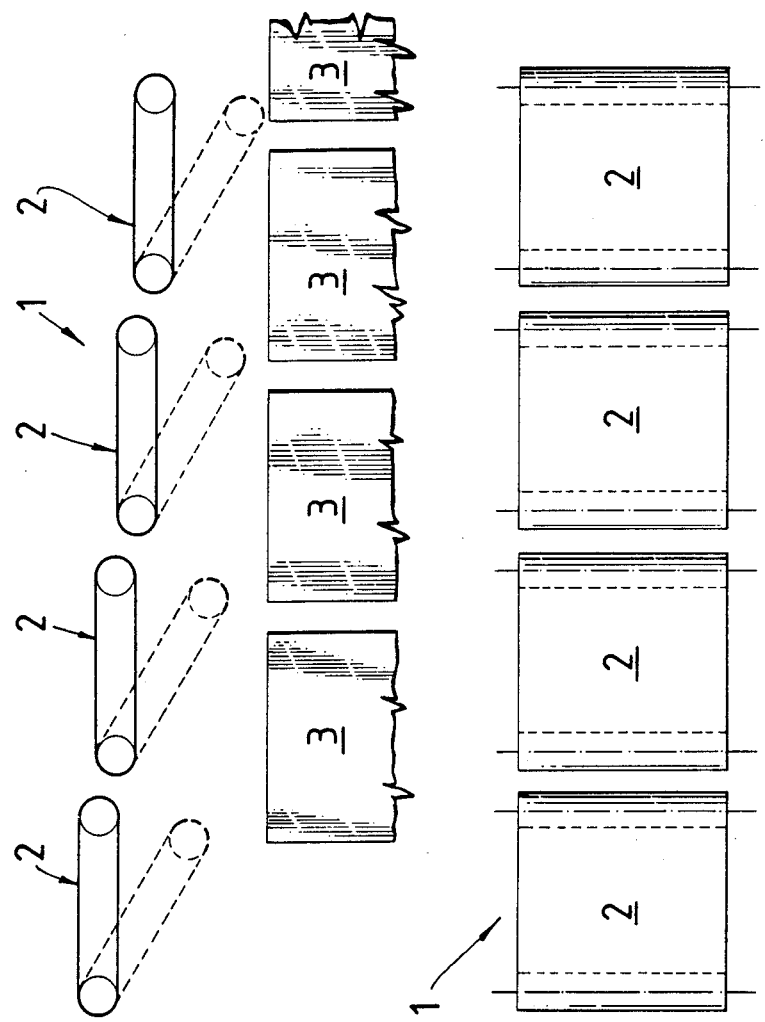
FIG. 1 shows schematically the side view of a portion of the conveyor according to this invention with the conveyor units of which it is made up in two different operating positions.
FIG. 2 is a plan view of FIG. 1.

The conveyor according to this invention consists of a plurality of conveyor units 2, vertically superimposed on the containers 3 used for collecting the sorted articles. The conveyor units 2 may oscillate angularly, as shown in FIGS. 1, 6 and 7, so as to convey the carried products directly into the containers 3. The conveyor units 2 define one or more conveyor ribbons 1a, running side by side. In each conveyor ribbon 1a the conveyor units 2 are arranged one after the other, each at a slightly lower level, as shown in FIG. 1. FIGS. 4 and 7 show conveyors provided with three conveyor ribbons 1a but it is obvious that a conveyor may have any number of ribbons 1a. FIGS. 4 and 7 also show that the conveyor 1, according to this invention, may be used in combination with other belt conveyors 4 which cross the ribbons 1a and are arranged below said ribbons. The belt conveyors 4 may advantageously include a conveyor system where the nodal points are provided with the sorting units described in the Italian Pat. No. 1.025.846. In this case the conveyor belts 4 located below the conveyor 1 feature no additional heightwise encumbrances and any further sorting devices will assume a substantially dipping position with respect to the conveyor blts.

Figure 5:
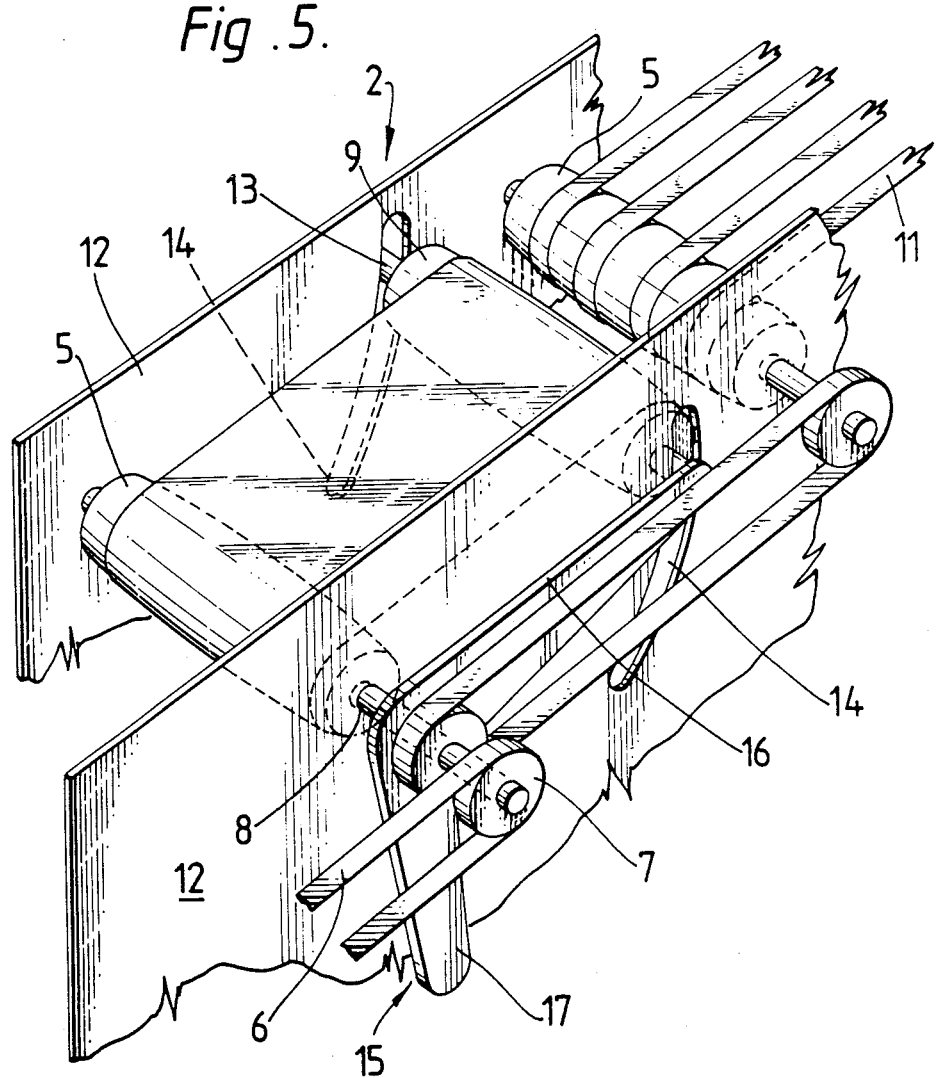
FIG. 5 is a detailed perspective of a conveyor unit of the belt conveyor according to this invention.

The structure of each conveyor unit 2 is shown in FIG. 5. These units consists substantially of a pair of rollers, of flexible conveyor elements and of a driving system capable of connecting the rollers with each other and of transmitting the angular oscillation movement. The first roller 5 of the pair is driven by a belt 6 which engages a belt pulley 7 splined to the shaft 8 of the said roller 5 while the second roller 9 of the pair is preferably idle. The shape of these rollersis shown in FIG. 3; the rollers are slightly bulging and provided with grooves 10 designed to accommodate the conveyor belts 11.

While the shaft 8 of the first roller 5 is stationary and supported on both ends in the side members 12, the shaft 13 of the second roller 9 is designed to oscillate within large slots 14 cut into the side members 12. Slots 14 are shaped like the arc of a circle whose radius is determined from the axis of rotation of the shaft 8 of the first roller 5. The second roller 9 is supported and controlled by the above-mentioned driving system which includes an L-shaped element 15 consisting of a first leg 16 which connects shaft 8 with shaft 13 and of a second leg 17, substantially perpendicular to the first leg, and connected to rods or similar items which control the rocking movement of the second roller 9. The operation of the conveyor is as follows, with reference to FIGS. 1,5, 6 and 7.

The articles to be sorted are carried by the conveyor belts of the various conveyor units 2 which define sustantially continuous conveying ribbons 1a along which the carried articles may advance without interruption. In order to favor a smooth movement of the carried articles each conveyor unit 2 may be arranged at a slightly lower level with respect to the previous one so as to ensure the smooth transfer of the articles from one conveyor unit to the next. The conveyor units 2 are longitudinally spaced apart from each other.

Each conveying ribbon 1a is substantially independent and surmounts a set of containers 3 and/or conveyor belts 4 which are part of another conveyor system. All the rollers of all the conveyor units 2 turn at the same speed.

When a carried article must be placed into a given container 3 or on a given belt 4, the L-shaped elements 15 of the conveyor unit 2 located over the said container 3 or belt 4 on the same ribbon 1a along which the article moves forward, are actuated. The L-shaped elements 15 are moved in an angular direction and the second roller 9 consequently moves along the path imposed by the shape of the slots 14 until it is sufficiently lowered to allow the article to be sorted to drop into the selected container 3 or on the belt 4 for a possible further sorting. Thereupon the second roller 9 of the conveyor unit 2 is lifted back into its original position and the conveyor ribbon 1a which includes the conveyor unit 2 involved in the above operation, reverts to its previous state of continuity. An article placed behind the article just sorted may consequently move beyond the conveyor unit 2 in question.

Each conveyor unit 2 is controlled independently, regardless of the movements of the adjoining conveyor units belonging to diffrent conveyor ribbons 1a. The invention thus achieves its aims.

The extreme simplicity of the proposed conveyor, its small size and the wide range of the possible sortings it affords should be duly stressed.

Due importance should also be given to the flexibility featured by this conveyor which may be suitably combined with other conveyors of the same or of different types. In addition, any kind of conveyor belt units may be usd. The invention is susceptible of many further improvements and changes, all of which fall within the scope of the original idea.

It should also be stressd that all the parts may be replaced with technically equivalent items. In practice, the materials, shapes and dimensions used may be of any type whatsoever.

I claim:

1. A conveyor system for the conveying and sorting or articles into a receiving apparatus comprising:
    a plurality of conveying units arranged in side by side relationship for conveying articles along independent paths, each of said units including:
    a plurality of endless, longitudinally spaced apart conveying belts positioned lengthwise adjacent each other and mounted for movement in a direction along which the articles are to be conveyed, each of said belts being positioned at a level slightly below that of the preceding belt so as to promote smooth transfer of the articles to said each belt from said preceding belt, and at least one of said conveying belts being superimposed on the receiving apparatus;
    a first roller and a second roller, positioned in each of said conveying belts;
    each of said first and second rollers having a shaft having end portions extending axially therethrough;
    means for driving said rollers;
    two spaced apart side members extending perpendicularly to said first and second rollers and in which said end portions of the shaft of said first roller are mounted for rotation, each of said side members having a slot associated with each conveying belt and extending substantially vertically therein for guiding the oscillating movement of said conveying belt, through which slot the respective end portions of said second roller are mounted, said slot having an arcuate configuration whose radius is determined from the axis of rotation of the shaft of said first roller; and
    means associated with each of said conveying belts for oscillating said conveying belt between a horizontal position in which articles are conveyed to the next adjacent conveying belt and a discharge position in which the articles are deposited into a receiving apparatus, said oscillating means including at least one L-shaped member having a first leg connecting said first and said second rollers and a second leg extending perpendicularly from said first leg for controlling the oscillating movement of said second roller, said at least one L-shaped member being mounted for pivotal movement around the shaft of said first roller.

2. The conveyor system according to claim 1 wherein said driving means includes a driving belt joining said first roller of each conveying belt to the first roller of the next adjacent conveying belt.

3. The conveyor system according to claim 2 wherein each of said rollers has a elongate rounded configuration.

4. The conveyor system according to claim 3 wherein each of said rollers has a plurality of circumferential grooves.

5. The conveyor system according to claim 4 wherein each of said endless belts includes a plurality of narrow belt elements, each of said elements being accommodated in a respective circumferential groove.

6. A conveyor system as in claim 1, wherein said side members extend above said conveying belts and in said direction along which the articles are to be conveyed from said first roller to said second roller.